United States Patent Office 3,494,974
Patented Feb. 10, 1970

3,494,974
TRIFLUOROMETHANE AND CHLORODIFLUORO-
METHANE PRODUCTION, PLASMA JET PYROL-
YSIS OF 1,2-DICHLOROTETRAFLUOROETHANE,
HYDROGENOLYSIS OF REACTION EFFLUENT
THUS OBTAINED, AND HYDROGENOLYSIS OF
CHLOROTRIFLUOROMETHANE AND/OR
DICHLORODIFLUOROMETHANE
Geir Bjornson, Bartlesville, Okla., assignor to Phillips
Petroleum Company, a corporation of Delaware
Filed Sept. 28, 1966, Ser. No. 582,732
Int. Cl. C07c 19/08
U.S. Cl. 260—653                                   7 Claims

ABSTRACT OF THE DISCLOSURE

Trifluoromethane is produced by plasma jet pyrolysis of 1,2-dichlorotetrafluoroethane and hydrogenation of the plasma jet effluent. Temperatures in the approximate range 500 to 10,000° C. for the contact time of 0.0001–10 seconds followed by immediate contact with hydrogen gas are disclosed.

Figure 1:
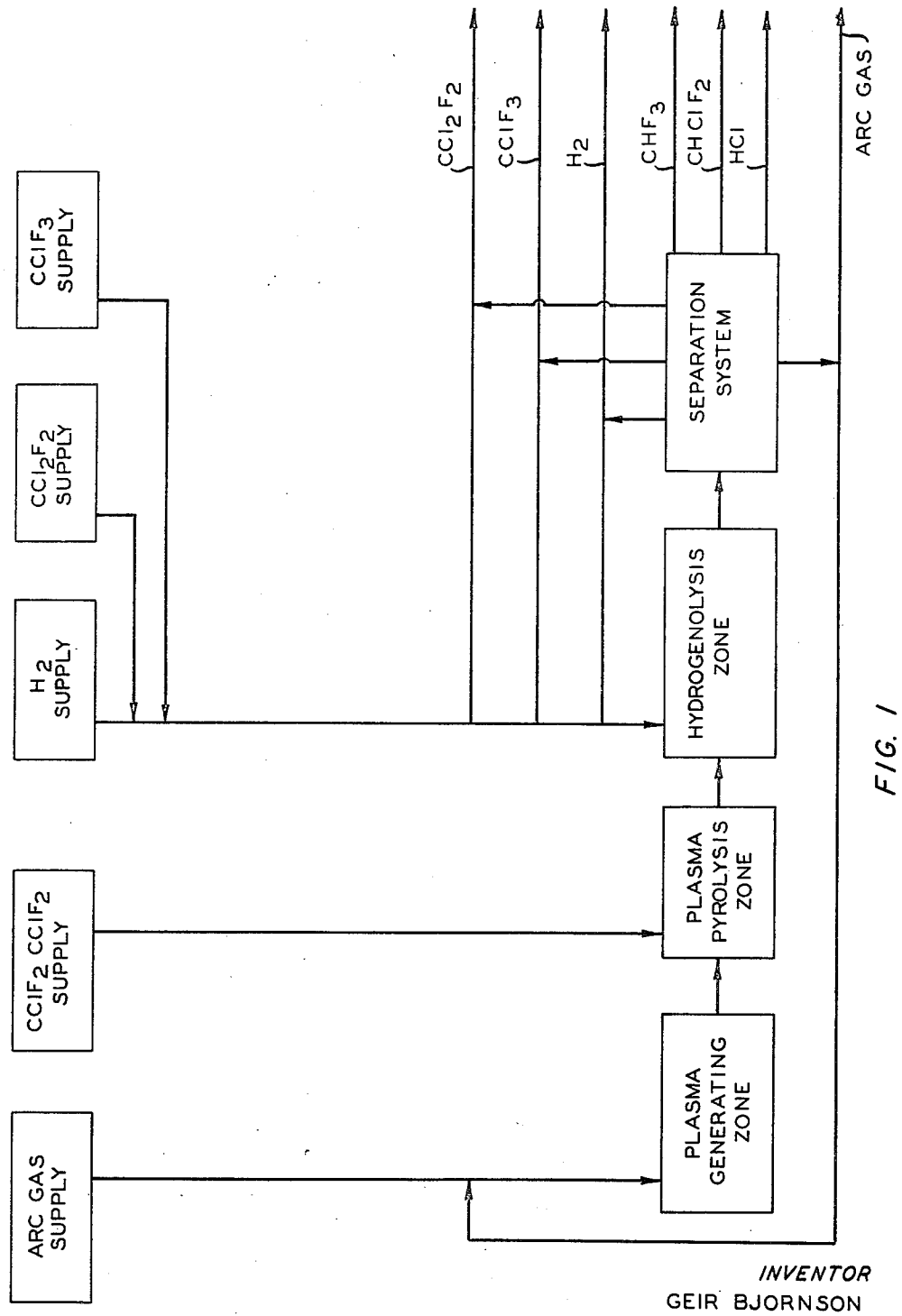

Hydrogenolysis of chlorotrifluoromethane and/or dichlorodifluoromethane to form at least one of trifluoromethane and chlorodifluoromethane and plasma jet hydrogenation of at least one of dichlorodifluoromethane and chlorotrifluoromethane are also disclosed.

---

This invention relates to the production of trifluoromethane and chlorodifluoromethane. It also relates to plasma jet pyrolysis of 1,2-dichlorotetrafluoroethane. Further, it also relates to further treatment in the operation under conditions of hydrogenolysis of certain products, e.g., chlorotrifluoromethane and dichlorodifluoromethane, obtained in the operation.

In one of its concepts, the invention provides a process for plasma jet pyrolysis of 1,2-dichlorotetrafluoroethane followed by hydrogenolysis of the effluent from the plasma jet pyrolysis operation. In another of its concepts, the invention provides a process for the production of trifluoromethane and chlorodifluoromethane by subjecting 1,2-dichlorotetrafluoroethane to plasma jet pyrolysis conditions and subsequently hydrogenating the plasma jet pyrolysis product by contacting the same with hydrogen. A still further concept of the invention provides a process for hydrogenolysis of chlorotrifluoromethane and/or dichlorodifluoromethane which may have been obtained in the operation just described, to trifluoromethane and/or chlorodifluoromethane. In a still further and broader concept, the invention provides a process for the hydrogenolysis of chlorotrifluoromethane and/or dichlorodifluoromethane under conditions of hydrogenolysis in a hydrogenolysis zone. In a still further, but more limited, concept of the invention, it provides a process for hydrogenolysis of chlorotrifluoromethane and/or dichlorodifluoromethane in which the hydrogenolysis zone is located in a zone in a portion of which there is present a plasma jet.

I have now discovered that high yields of trifluoromethane and chlorodifluoromethane can be produced by contacting 1,2-dichlorotetrafluoroethane with a plasma and subsequently contacting the plasma reaction product with hydrogen. This can be done in any conventional plasma reactor having provision for gas injection downstream from the plasma generator. I have further discovered that high yields of trifluoromethane can be produced by contacting chlorotrifluoromethane and hydrogen in the presence of hot effluent form a plasma jet and that high yields of chlorodifluoromethane can be produced by contacting dichlorodifluoromethane in the presence of hot effluent form a plasma jet.

An object of this invention is to provide a process for the plasma jet pyrolysis of 1,2-dichlorotetrafluoroethane and the subsequent hydrogenolysis of the plasma jet reaction product. Another object of this invention is to produce trifluoromethane and chlorodifluoromethane. A further object of this invention is to produce good yields of trifluoromethane and chlorodifluoromethane. A further object of this invention is to produce trifluoromethane by the reaction of chlorotrifluoromethane and hydrogen. A still further object of this invention is to produce chlorodifluoromethane by the reaction of dichlorodifluoromethane and hydrogen.

Other concepts, objects and the several advantages of the invention are apparent from a study of this disclosure, the drawing and the appended claims.

According to the present invention there is provided a process for plasma pyrolysis of 1,2-dichlorotetrafluoroethane and subsequent hydrogenolysis of the plasma reaction products, which include chlorotrifluoromethane and dichlorodifluoromethane, to trifluoromethane and chlorodifluoromethane respectively. The reaction can be represented as follows:

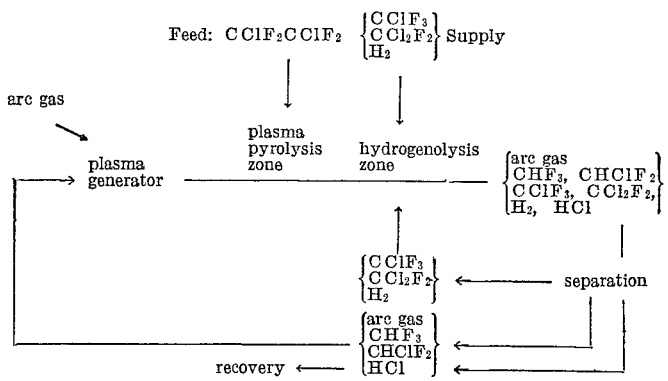

Also according to the invention, there is provided a process for the hydrogenolysis of chlorotrifluoromethane and/or dichlorodifluoromethane. In one embodiment of the last mentioned process, the hydrogenolysis zone is located in a portion of a plasma jet reaction zone or reactor.

Further according to the invention, the plasma jet reactor is so designed and operated that the 1,2-dichlorotetrafluoroethane feed is contacted with the plasma at temperatures in the approximate range 500 to 10,000° C. for a contact time of the order of 0.0001 to 10 seconds. A reactor can be so designed and operated in accordance with this invention that each or any combination of pyrolysis products of 1,2-dichlorotetrafluoroethane, chlorotrifluoromethane, or dichlorodifluoromethane can be contacted with hydrogen at temperatures in the approximate range of 5,000° C. to 300° C. for a contact time in the order of 0.0001 to 10 seconds. In any event the conditions and operations are so conducted as to reach the results here set forth, the specific conditions being dependent upon a number of factors for best results in each set of circumstances. Methods are known in the art whereby to effect such contacting. For example, in one such process, there is continuously passed the feed and a suitable plasma forming gas (arc gas) through an electric arc to a reaction chamber and then to a quench chamber at high velocity. Further, according to the invention, the reactor is so designed and operated that the hydrogen or hydrogen-containing gas can be contacted with the plasma reaction mixture after a substantial degree of pyrolysis has been effected, but while the mixture will retain a substantial amount of the heat present at the time of pyrolysis.

Further, according to the invention the reactor is so designed and operated that chlorotrifluoromethane and/or dichlorodifluoromethane feed can be contacted with hydrogen in the hydrogenolysis zone of the reactor in the presence of either pyrolysis products of 1,2-dichlorotetrafluoroethane and hot arc gas from substantially expended plasma or in the presence of hot arc gas from substantially expended plasma. Thus, the hydrogen-containing gas can be charged to the reaction chamber at a point downstream of the arc but sufficiently upstream of the quench chamber so that the desired degree of hydrogenolysis takes place before quenching. In like manner, chlorotrifluoromethane and/or dichlorodifluoromethane can be charged to the reaction chamber downstream of the arc but sufficiently upstream of the quench zone and in such relation to the site of charge of hydrogen-containing gas that the desired degree of reaction takes place before quenching. It is often convenient to charge hydrogen-containing gas and either chlorotrifluoromethane or dichlorodifluoromethane or a mixture thereof to the reaction chamber through a single injection port though multiple ports can be employed.

A now preferred method of operation and a reactor therefor uses tangential injection of the 1,2-dichlorotetrafloroethane feed into a reactor just downstream of the arc and the subsequent tangential injection of hydrogen and optionally chlorotrifluoromethane and/or dichlorodifluoromethane still further downstream before passing the reaction mixture into the quench chamber.

Though atmospheric pressure is now preferred because of convenience, the invention contemplates operation at subatmospheric as well as superatmospheric pressures.

Examples of plasma forming gases (arc gases) include argon, nitrogen, helium, neon, krypton, and the like. The plasma can be generated with any conventional plasma forming gas which does not deleteriously affect the pyrolysis and hydrogenolysis reactions of the invention.

Presently, the halocarbon feeds for the plasma jet process of the invention, 1,2-dichlorotetrafluoroethane, chlorotrifluoromethane, and dichlorodifluoromethane, separately or in combination, are readily available either as commercial products or can be readily produced by conventional methods. Chlorotrifluoromethane and dichlorodifluoromethane are obtained, as noted, from the process effluent and are recycled to the operation as desired, also as in the manner noted.

The products of the process of the invention are valuable precursors to fluoroolefins. Thus, trifluoromethane can be pyrolyzed at high temperatures to produce tetrafluoroethene and hexafluoropropene, valuable monomers for the production of fluorocarbon polymers.

As will be more fully appreciated upon consideration of the examples herein, the process of the present invention is advantageous in that intermediates or by-products can be readily hydrogenated or recycled. Thus, the intermediate chlorotrifluoromethane and dichlorodifluoromethane can be readily hydrogenated to the products trifluoromethane and chlorodifluoromethane respectively. Any unreacted chlorotrifluoromethane and/or dichlorodifluoromethane feed, hydrogen, and arc gas can be recycled.

Figure 2:
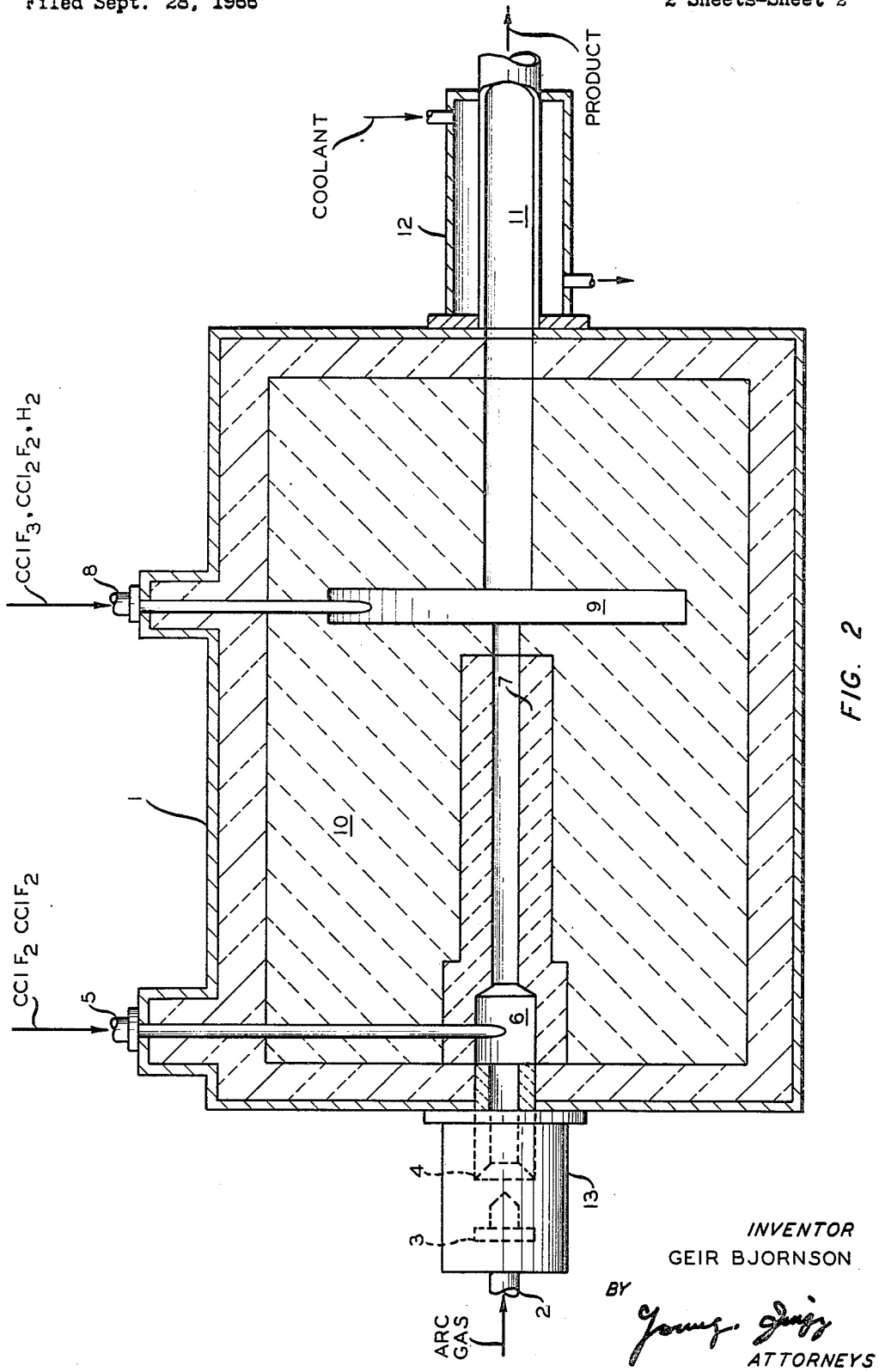

In the drawings, FIGURE 1 is a diagrammatic showing of a flow according to the invention. FIGURE 2 is a vertical cross section of an apparatus for carrying out the operation of the invention.

Referring now to the drawings, FIGURE 2, there is shown a plasma jet reactor at 1. Arc gas, which is argon in this instance, is introduced through pipe 2, past cathode 3 to the plasma generator 13. An arc is established between cathode 3 and the interior portion of the anode 4. The 1,2-dichlorotetrafluoroethane feed enters the reactor through port 5 just downstream of the anode, and is there contacted with plasma in the plasma pyrolysis zone 6 which is encircled with carbon 7. The hot gas stream of pyrolyzed feed encounters hydrogen gas fed into the stream through port 8 which is positioned to feed the hydrogen into the pyrolyzed feed substantially near or beyond the end of the arc so as to permit the desired pyrolysis to take place and to give reaction time for the hydrogenolysis reaction to occur to a desired extent. If desired, chlorotrifluoromethane and/or dichlorodifluoromethane from a feed source and/or as recycle can be passed into the reactor along with hydrogen through the downstream port 8 to the hydrogenolysis zone 9 which is encircled with zirconia 10 while 1,2-dichlorotetrafluoroethane and/or hydrogen is passed to the pyrolysis zone 6 through the upstream injection port 5. The combined effluent reaction products are then passed to a quench zone 11, here located within a water cooled condenser 12. The combined effluent reaction products are then passed through an air cooled cooler, a water cooled cooler and a water bubbler to a separator, which are not shown in the drawing for the sake of simplicity, for recovery and recycle if desired. Samples can be taken to a sample bulb through a filter and calcium sulfate drier from the effluent reaction product stream at a point downstream of the bubbler but upstream of separation equipment.

It is within the scope of the invention to introduce separately the feeds which have been described here as being introduced together through port 8, thus to obtain maximum benefit of reaction times of the specific feeds.

The following are examples of the invention.

EXAMPLE I

Argon plasma was produced in a plasma reactor similar to the reactor described above by passing argon through an electric arc at 1 c.f.m. 1,2-dichlorotetrafluoroethane was tangentially charged to the plasma pyrolysis zone 6, a zone of argon plasma downstream from the arc, as shown in the drawing, through the upstream injection port 5 at the rate of 10.77 lb./hr. Also as shown in the drawing, hydrogen was charged at the rate of 0.24 lb./hr. through the downstream tangential injection port 8 to the hydrogenolysis zone 9 at a point six inches downstream from the point of injection of 1,2-dichlorotetrafluoroethane. The temperature in the hydrogenolysis zone 9 was estimated to be in the order of 620° C. The reaction product mixture was then passed to the condenser, heat exchanger, water bath, bubbler, and from the system. Samples for analysis were taken through a filter and CaSO₄ drier at a point downstream of the bubbler. The gross energy input was 4.8 kg./hr., and net input of 1.9 kw./hr. was effected at 200 amps and 24 volts. Samples were colletced and analyzed by gas-liquid chromatography, and the effluent was determined to have the following composition.

Mole percent of products in effluent

| | |
|---|---|
| Unconverted $CClF_2CClF_2$ | 0 |
| $CClF_3$ | 68.0 |
| $CHF_3$ | 22.3 |
| $CCl_2F_2$ | 5.0 |
| $CH_2F_2$ | 0 |
| $CHClF_2$ | 2.8 |
| Others | 1.9 |

This example shows that considerable quantities of $CHF_3$ and $CHClF_2$ are produced by downstream injection of hydrogen. Complete conversion of $CClF_2CClF_2$ is effected and the bulk of the remaining products is made up of $CClF_3$ and $CCl_2F_2$ which can readily be hydrogenated to $CHF_3$ and $CHClF_2$.

EXAMPLE II

Chlorotrifluoromethane instead of 1,2-dichlorotetrafluoroethane is charged to the hydrogenolysis zone through the downstream port in a run under conditions similar to those of Example I. Hydrogen is also charged to the hydrogenolysis zone through the downstream port. The chlorotrifluoromethane is found to be substantially converted to trifluoromethane. This example shows that chlorotrifluoromethane can be converted to trifluoromethane in excellent yield, thus effecting a high total yield of trifluoromethane as a result of the process of this invention.

EXAMPLE III

Dichlorodifluoromethane instead of 1,2-dichlorotetrafluoroethane is charged to the hydrogenation zone through the downstream port in a run under conditions similar to those of Example I. Hydrogen is also charged to the hydrogen zone through the downstream port as in Example I. The dichlorodifluoromethane feed is found to be substantially converted to chlorodifluoromethane. This example shows that chlorodifluoromethane is formed in excellent yield, thus effecting a significant total yield of chlorodifluoromethane as a result of the process of this invention.

EXAMPLE IV

An argon plasma was generated in the reactor shown in the drawing. Without hydrogen, 1,2-dichlorotetrafluoroethane was charged through the upstream tangential injection port 5. The following conditions were employed: 250 amps; 25 volts; 6.25 gross kw./hr.; 2.86 net kw./hr.; and 10.17 lb./hr. of 1,2-dichlorotetrafluoroethane. Conversion of 1,2-dichlorotetrafluoroethane was 100 percent. The products $CClF_3$ and $CCl_2F_2$ were present in the effluent in the following proportions: $CClF_3$, 91.2 mole percent; $CCl_2F_2$, 8.8 mole percent. This example shows that in the absence of hydrogen 1,2-dichlorotetrafluoroethane reacts in an argon plasma to give a conventional pyrolysis reaction and that the downstream injection of hydrogen is indeed necessary for satisfactory results.

The reactions involved in the operations of the invention can be viewed, from an overall chemical standpoint, to be essentially as follows.

$$2(CClF_2-CClF_2) \rightarrow 2CClF_3 + CCl_2F_2 + C$$

For complete hydrogenolysis the following equation would hold:

$$2CClF_3 + 2H_2 \rightarrow 2HCl + 2CHF_3$$

$$CCl_2F_2 + H_2 \rightarrow HCl + CHClF_2$$

$$2CClF_3 + CCl_2F_2 + 3H_2 \rightarrow 3HCl + 2CHF_3 + CHClF_2$$

The mole ratio of 1,2-dichlorotetrafluoroethane:$H_2$ is 2:3 as derived from the above equations. A range of from 1:8 to 2:1 can be used with an optimum of 2:3 preferred. Further, from the above equations, for a feed of $CClF_3$, the ratio $CClF_3$:$H_2$ is optimum at 1, and for a feed of $CCl_2F_2$, the ratio of $CCl_2F_2$:$H_2$ is optimum at 1; such hydrogenolysis can be effected at reasonable ranges around the optimums. In the case where mixtures of $CClF_3CClF_3$, $CCl_2F_2$, $CClF_3$ are used as feeds, the optimum amount of hydrogen to be charged can readily be calculated by one skilled in the art for any given concentration of each feed. Further, analyses of the various effluents from operations conducted under different conditions of time, temperature, ratios, etc., will aid in determining the real optima. While the foregoing reactions are given viewing the invention from an overall chemical standpoint, it is not here intended to limit the conversion or conversions of the invention to necessarily taking place as indicated.

A small plasma gun or generator such as used in the reactor of the runs of this invention can operate, with argon as arc gas, at 24 to 34 volts, 200 to 1200 amps, 5 to 36 kw. gross power, flow rates of argon of 0.8 to 3.0 standard cubic feet per hour, electrical efficiencies of 25 to 45 percent, and approximate net power applied to the arc gas 1.5 to 13 kw. This same gun with nitrogen, a more preferred arc gas because of high electrical efficiency and cheapness, and with different electrodes designed for operation with nitrogen can operate at 70 to 120 volts, 200 to 500 amps, a gross power of 14 to 40 kw., flow rates of nitrogen of 0.8 to 40 standard cubic feet per hour, electrical efficiencies of 50 to 75 percent, and approximate net power imparted to arc gas of 7.0 to 22 kw. Of course, larger type guns can utilize higher power ranges, and can give better electrical efficiency. For instance, with nitrogen, power can range from 100 kw. to 1 mega kw. and electrical efficiency can range form 85 to 90 percent. Percent electrical efficiency is defined as $Pi-PL/Pi$ (100) where $Pi$ is input power in kilowatts and PL is power loss to cooling medium in kw. The power requirements necessary to achieve 100 percent conversion of 1,2-dichlorotetrafluoroethane were as low as 0.50 gross kw./lb. of 1,2-dichlorotetrafluoroethane. A range of 0.20 to 1.0 gross kw./lb. of 1,2-dichlorotetrafluoroethane can be used. The above power requirements, which apply with argon as arc gas, can be calculated for nitrogen as arc gas by dividing by 1.7.

With special reference to that form of a process according to the invention in which chlorotrifluoromethane and/or dichlorodifluoromethane are subjected to hydrogenolysis with formation of tetrafluoromethane and/or chlorodifluoromethane in a plasma jet reactor, one skilled in the art will understand that the conditions prevailing in said reactor, rates of feed, etc., will affect yields which can be obtained for any given point of introduction of the material to be converted. Thus, whether the introduction of the feed to the hydrogenolysis zone is affected just at somewhat before or even well beyond what might be termed the end of plasma jet will depend upon the results to be obtained and the said conditions, rates, etc.

One skilled in the art in possession of this disclosure having studied same will be able by routine tests to determine the optimum point or points along the reactor for the introduction of the hydrogen and/or anyone or more of the materials or compounds which are to be introduced or which can be introduced.

Reasonable variation and modification are possible within the scope of the foregoing disclosure, the drawing and the appended claims to the invention, the essence of which is that there has been provided a process for the pyrolysis of 1,2-dichlorotetrafluoroethane and hydrogenolysis of the pyrolyzed feed to produce trifluoromethane and/or chlorodifluoromethane by first pyrolyzing in a plasma jet the feed thereto and then combining the plasma jet reaction product stream with hydrogen; there has been provided a process for the hydrogenolysis of chlorotrifluoromethane and/or dichlorodifluoromethane to trifluoromethane and/or chlorodifluoromethane respectively, as described herein; in one form of the last mentioned process the hydrogenolysis being effected in a hydrogenolysis section of a plasma jet reaction zone.

I claim:
1. A process for the production of trifluoromethane which comprises pyrolyzing in a plasma jet 1,2-dichlorotetrafluoroethane and then immediately and directly subjecting the pyrolysis effluent from the plasma jet to hydrogenation with a free hydrogen-containing gas.

2. A process according to claim 1 wherein the hydrogen is injected in a quantity sufficient, and at a point such following upon the plasma jet reaction, that the desired trifluoromethane is obtained in appreciable amount.

3. A process according to claim 2 for converting 1,2-dichlorotetrafluoroethane to a reaction effluent comprising trifluoromethane which comprises introducing the same into a plasma produced in an electric plasma reactor therein subjecting the same to a temperature in the approximate range 500 to 10,000° C. for a contact time of 0.0001 to 10 seconds, following which effluent thus obtained while still in the reaction zone is immediately contacted with hydrogen gas in an amount effective to yield appreciable quantity of trifluoromethane.

4. A process according to claim 1 wherein the effluent from the operation is passed to a separation zone, in said separation zone there is separated from said effluent at least one dichlorodifluoromethane, chlorotrifluoromethane and hydrogen and wherein at least one of said separated components is subjected to hydrogenation.

5. A process according to claim 4 wherein the hydrogenation of the pyrolysis effluent from the plasma jet and the hydrogenation of any returned component is effected in a hydrogenolysis zone immediately following upon the zone in which said 1,2-dichlorotetrafluoroethane has been pyrolyzed.

6. A process which comprises subjecting at least one of chlorotrifluoromethane and dichlorodifluoromethane to conditions of hydrogenolysis to form at least one of trifluoromethane and chlorodifluoromethane.

7. A process according to claim 6 wherein the hydrogenolysis is effected by passing at least one of the substances to be subject to hydrogenolysis in the presence of hydrogen through a downstream portion of a plasma jet reaction zone.

References Cited

UNITED STATES PATENTS

| 2,709,189 | 5/1955 | Farlow et al. | 260—653 |
| 2,992,280 | 7/1961 | Olstowski et al. | 260—653 |
| 3,042,727 | 7/1962 | Olstowski et al. | 260—653 |

DANIEL D. HORWITZ, Primary Examiner